(12) United States Patent
Wells et al.

(10) Patent No.: US 7,143,298 B2
(45) Date of Patent: Nov. 28, 2006

(54) METHODS AND APPARATUS FOR BACKING UP A MEMORY DEVICE

(75) Inventors: Owen Newton Wells, Stanardsville, VA (US); Todd Philip Pfister, Earlysville, VA (US)

(73) Assignee: GE FANUC Automation North America, Inc., Charlottesville, VA (US)

( * ) Notice: Subject to any disclaimer, the term of this patent is extended or adjusted under 35 U.S.C. 154(b) by 496 days.

(21) Appl. No.: 10/124,973

(22) Filed: Apr. 18, 2002

(65) Prior Publication Data

US 2003/0200382 A1 Oct. 23, 2003

(51) Int. Cl.
*G11C 11/406* (2006.01)
*G06F 1/26* (2006.01)

(52) U.S. Cl. ..................... 713/300; 711/106
(58) Field of Classification Search .............. 714/6; 711/106, 128; 365/63, 222; 361/15, 77
See application file for complete search history.

(56) References Cited

U.S. PATENT DOCUMENTS

| | | | | |
|---|---|---|---|---|
| 4,383,184 A | * | 5/1983 | McFarland | .................... 307/66 |
| 5,365,487 A | * | 11/1994 | Patel et al. | .................. 365/226 |
| 5,475,645 A | * | 12/1995 | Wada | ......................... 365/222 |
| 5,594,908 A | | 1/1997 | Hyatt | |
| 5,764,465 A | * | 6/1998 | Mattes et al. | .................. 361/77 |
| 5,784,548 A | * | 7/1998 | Liong et al. | .................... 714/6 |
| 5,940,851 A | * | 8/1999 | Leung | ......................... 711/106 |
| 5,995,405 A | * | 11/1999 | Trick | ............................ 365/63 |
| 6,088,762 A | * | 7/2000 | Creta | ......................... 711/106 |
| 6,128,746 A | * | 10/2000 | Clark et al. | .................. 713/324 |
| 6,134,167 A | | 10/2000 | Atkinson | |
| 6,212,599 B1 | * | 4/2001 | Baweja et al. | ............. 711/106 |
| 6,275,901 B1 | * | 8/2001 | Zager et al. | ................ 711/128 |
| 6,487,648 B1 | * | 11/2002 | Hassoun | ...................... 711/167 |
| 6,829,677 B1 | * | 12/2004 | Attaway et al. | ............ 711/106 |
| 6,833,983 B1 | * | 12/2004 | Nguyen et al. | ............... 361/15 |

OTHER PUBLICATIONS

Tyson, Jeff and Coustan, Dave, "How RAM Works", http://computer.howstuffworks.com/ram.htm.*

* cited by examiner

*Primary Examiner*—Thomas Lee
*Assistant Examiner*—Ji H. Bae
(74) *Attorney, Agent, or Firm*—Mark A. Conklin; Armstrong Teasdale LLP

(57) ABSTRACT

A memory module for a computer-based system. The memory module includes at least one memory device that requires periodic refresh signals to maintain data and is mounted on the memory module, and a circuit mounted on the memory module and configured to retain data stored on the memory device when the computer-based system loses power. In a separate embodiment, a control circuit is configured to logically detach at least one memory device from at least one memory controller when a computer-based system loses power, and retain data stored on the memory device when the computer-based system loses power.

66 Claims, 8 Drawing Sheets

FIG. 2B

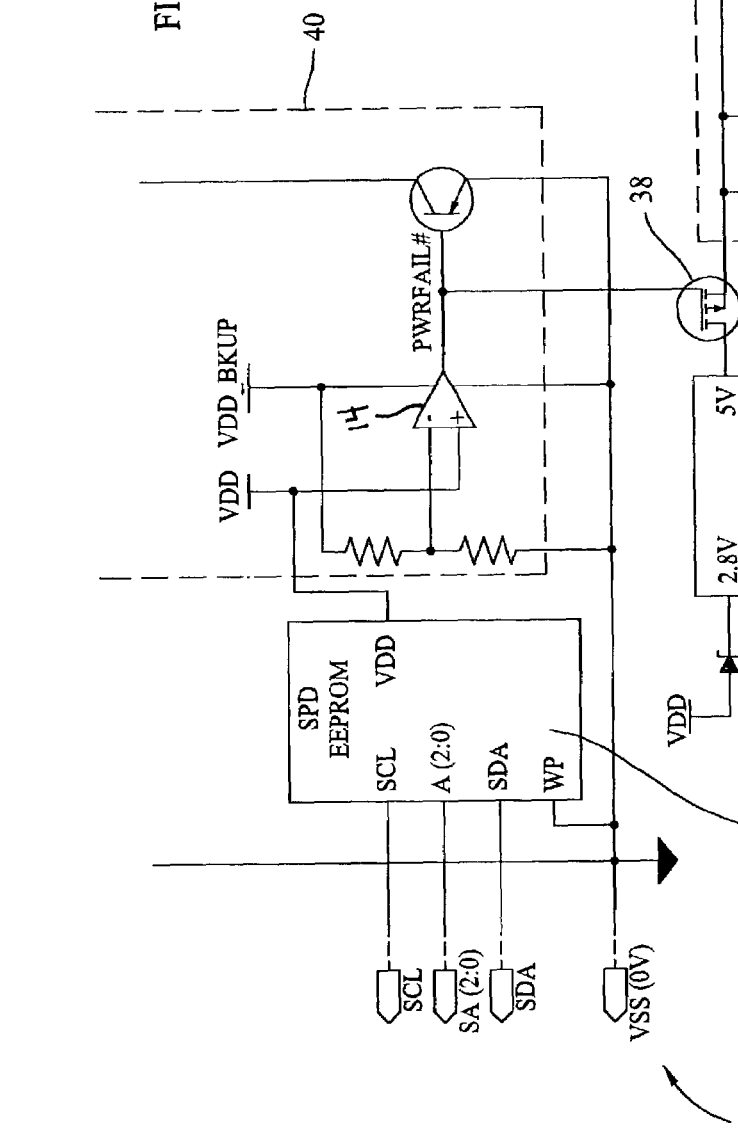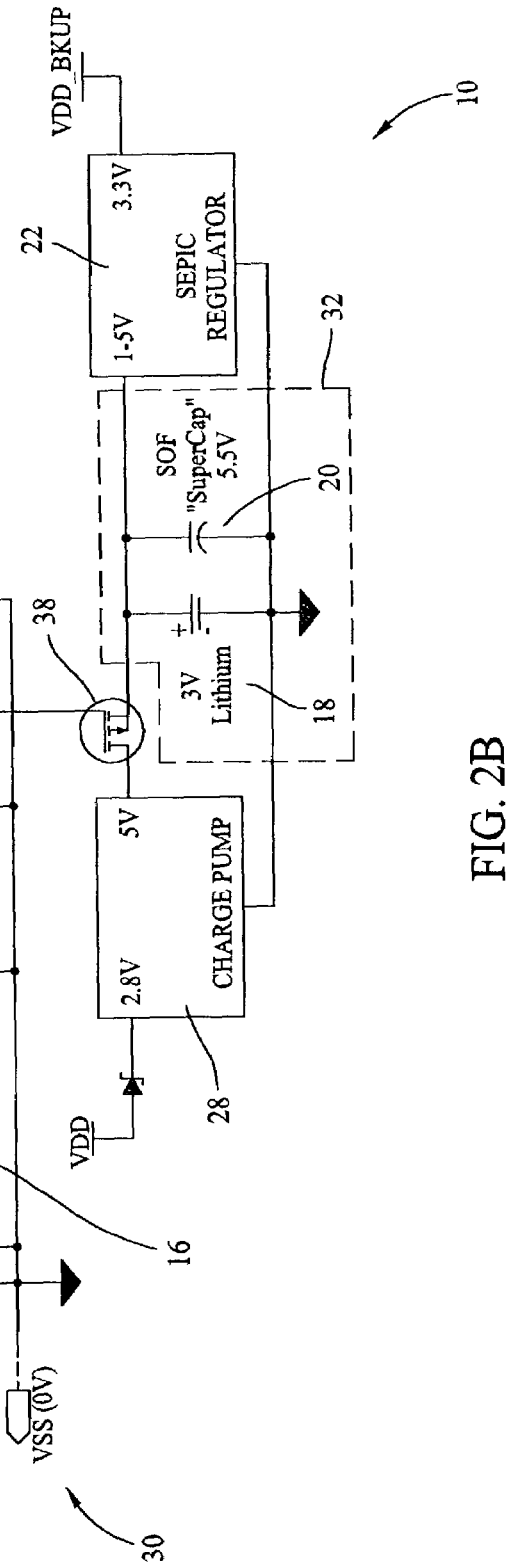
FIG. 2A
FIG. 2B

Primitive Flow Table

|  |  | RST# CKE CMD | | | | | | | | |
|---|---|---|---|---|---|---|---|---|---|---|
| State Description | S | 011 | 010 | 110 | 100 | 000 | 001 | 101 | 111 | out |
| Idle, waiting for activity | A | - | B | A | C | - | - | - | D | 1 |
| Reset state | B | F | B | A | - | E | - | - | - | 1 |
| Triggered on CKE going low | C | - | - | G | C | E | - | H | - | 0 |
| Auto refresh | D | F | - | A | - | - | - | H | D | 1 |
| Alternate reset state 1 | E | - | B | - | C | E | J | - | - | 1 |
| Alternate reset state 2 | F | F | B | - | - | - | J | - | D | 1 |
| CKE went high when out already = "0" | G | - | B | G | C | - | - | - | D | 0 |
| Self refresh | H | - | - | - | C | - | J | H | D | 0 |
| Alternate reset state 3 | J | F | - | - | - | E | J | H | - | 1 |

Reduced Flow Table

|  |  | RST# CKE CMD | | | | | | | | |
|---|---|---|---|---|---|---|---|---|---|---|
| State Description | S | 011 | 010 | 110 | 100 | 000 | 001 | 101 | 111 | out |
| Idle, waiting for activity | A | A | A | A | C | A | A | C | A | 1 |
| Triggered on CKE going low | C | - | A | C | C | A | A | C | A | 0 |

State Table

|  |  | RST# CKE CMD | | | | | | | | |
|---|---|---|---|---|---|---|---|---|---|---|
| State Description | S | 011 | 010 | 110 | 100 | 000 | 001 | 101 | 111 | out |
| Idle, waiting for activity | 1 | 1 | 1 | 1 | 0 | 1 | 1 | 0 | 1 | 1 |
| Triggered on CKE going low | 0 | - | 1 | 0 | 0 | 1 | 1 | 0 | 1 | 0 |

Where CMD = WE# AND NOT CS# AND NOT RAS# AND NOT CAS#

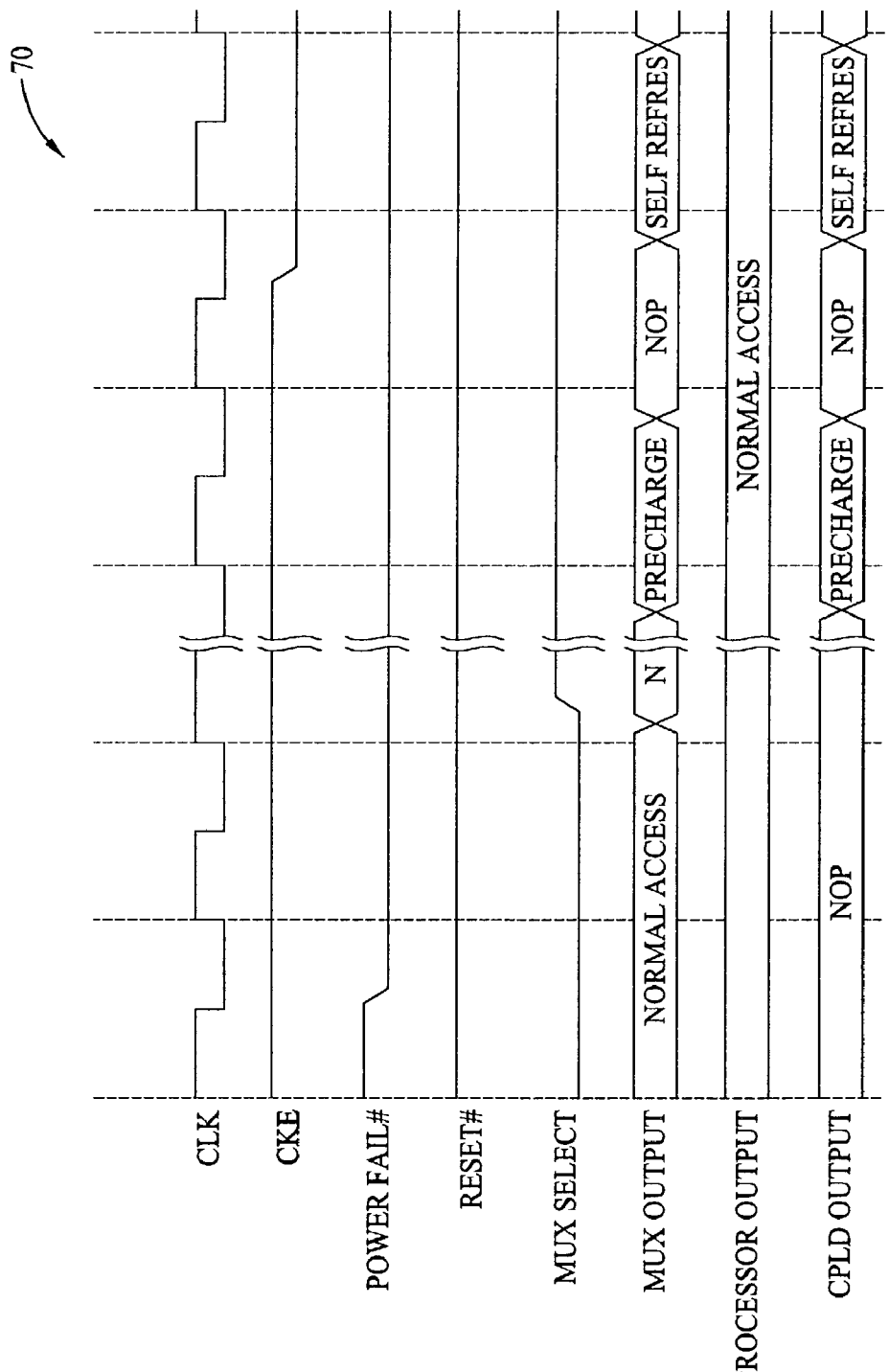

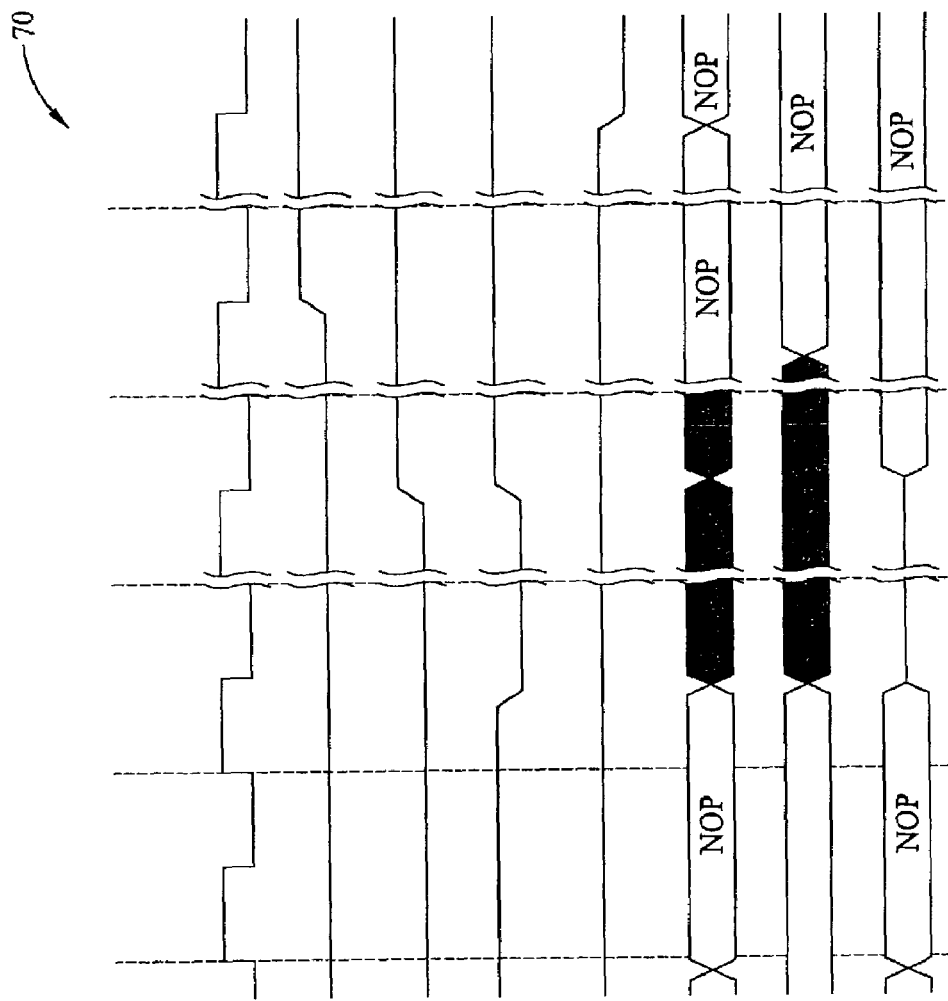
FIG. 6A — FIG. 6B

| NAME (FUNCTION) | CS# | RAS# | CAS# | WE# | DQM | ADDR | DQs | NOTES |
|---|---|---|---|---|---|---|---|---|
| COMMAND INHIBIT (NOP) | H | X | X | X | X | X | X | |
| NO OPERATION (NOP) | L | H | H | H | X | X | X | |
| ACTIVE (Select bank and activate row) | L | L | H | H | X | Bank/Row | X | 3 |
| READ (Select bank and column, and start READ burst) | L | H | L | H | L/H | Bank/Col | X | 4 |
| WRITE (Select bank and column, and start WRITE burst) | L | H | L | L | L/H | Bank/Col | Valid | 4 |
| BURST TERMINATE | L | H | H | L | X | X | Active | |
| PRECHARGE (Deactivate row in bank or banks) | L | L | H | L | X | Code | X | 5 |
| AUTO REFRESH or SELF REFRESH (Enter self refresh mode) | L | L | L | H | X | X | X | 6,7 |
| LOAD MODE REGISTER | L | L | L | L | X | Op-Code | X | 2 |
| Write Enable/Output Enable | - | - | - | - | L | - | Active | 8 |
| Write Inhibit/Output High-Z | - | - | - | - | H | - | High-Z | 8 |

METHODS AND APPARATUS FOR BACKING UP A MEMORY DEVICE

BACKGROUND OF THE INVENTION

The present invention relates generally to memory devices, and more particularly to memory devices that require periodic refresh signals to maintain their data contents, such as synchronous dynamic random access memory (SDRAM) devices.

SDRAM consists of an array of capacitive cells having a voltage that degrades over time as a function of the capacitance and the internal device resistance at the cells terminals, referred to as the time constant of the circuit, or 1/RC. As the voltage of a cell degrades over time from its nominal voltage, the voltage will decrease into a transition region wherein the equivalent binary data bit value represented by that voltage value is indeterminate; i.e. the data bit value is neither a binary '0' or a binary '1'. Eventually the voltage will degrade to zero, and thus, SDRAMs require periodic refresh signals from a host memory controller to recharge the cells to nominal voltage levels. SDRAMs may lose data, even if the SDRAMS have backup power from a battery, if the host memory controller loses power and ceases issuing refresh signals. However, at least some known host memory controllers consume more electrical power than may be practically supplied by a backup battery.

BRIEF DESCRIPTION OF THE INVENTION

In one aspect, a memory module is provided for a computer-based system. The memory module includes at least one memory device that requires periodic refresh signals to maintain data and is mounted on the memory module, and a circuit mounted on the memory module and configured to retain data stored on the memory device when the computer-based system loses power.

In another aspect, a method is provided for retaining data saved on a memory device in a computer-based system. The computer-based system includes a power supply, at least one memory module having at least one memory device that requires periodic refresh signals to maintain data, and a circuit mounted on the memory module. The method includes sensing an impending loss of power from the computer-based system power supply, signaling, using the circuit, the memory device into a self refresh power down state wherein at least one of the memory device and the circuit generates internal refresh signals to maintain data, and maintaining, using the circuit, the self refresh power down state while the computer-based system is inactive.

In yet another aspect, a control circuit is provided for controlling at least one memory device in a computer-based system having at least one memory controller. The circuit includes at least one memory device that requires periodic refresh signals to maintain data. The circuit is configured to logically detach the at least one memory device from the at least one memory controller when the computer-based system loses power, and retain data stored on the memory device when the computer-based system loses power.

In a further aspect, a method is provided for retaining data saved on at least one memory device in a computer-based system using a circuit. The computer-based system includes a power supply and a memory controller. The memory device requires periodic refresh signals to maintain data. The method includes sensing an impending loss of power from the computer-based system power supply, and logically detaching the memory device from the memory controller using the circuit.

BRIEF DESCRIPTION OF THE DRAWINGS

FIG. 3 is a table illustrating state tables for one embodiment of a high-speed asynchronous state machine illustrated in FIGS. 2A and 2B.

FIG. 4 is a karanaugh map for one embodiment of the high-speed asynchronous state machine illustrated in FIGS. 2A and 2B.

FIGS. 6A and 6B are an example of an SDRAM power-up/down command sequence for the power-up/down control circuit illustrated in FIG. 5.

FIG. 7 is a table illustrating various SDRAM commands for the memory module illustrated in FIGS. 1, 2A, and 2B, and the power-up/down control circuit illustrated in FIG. 5.

DETAILED DESCRIPTION OF THE INVENTION

Figure 1:
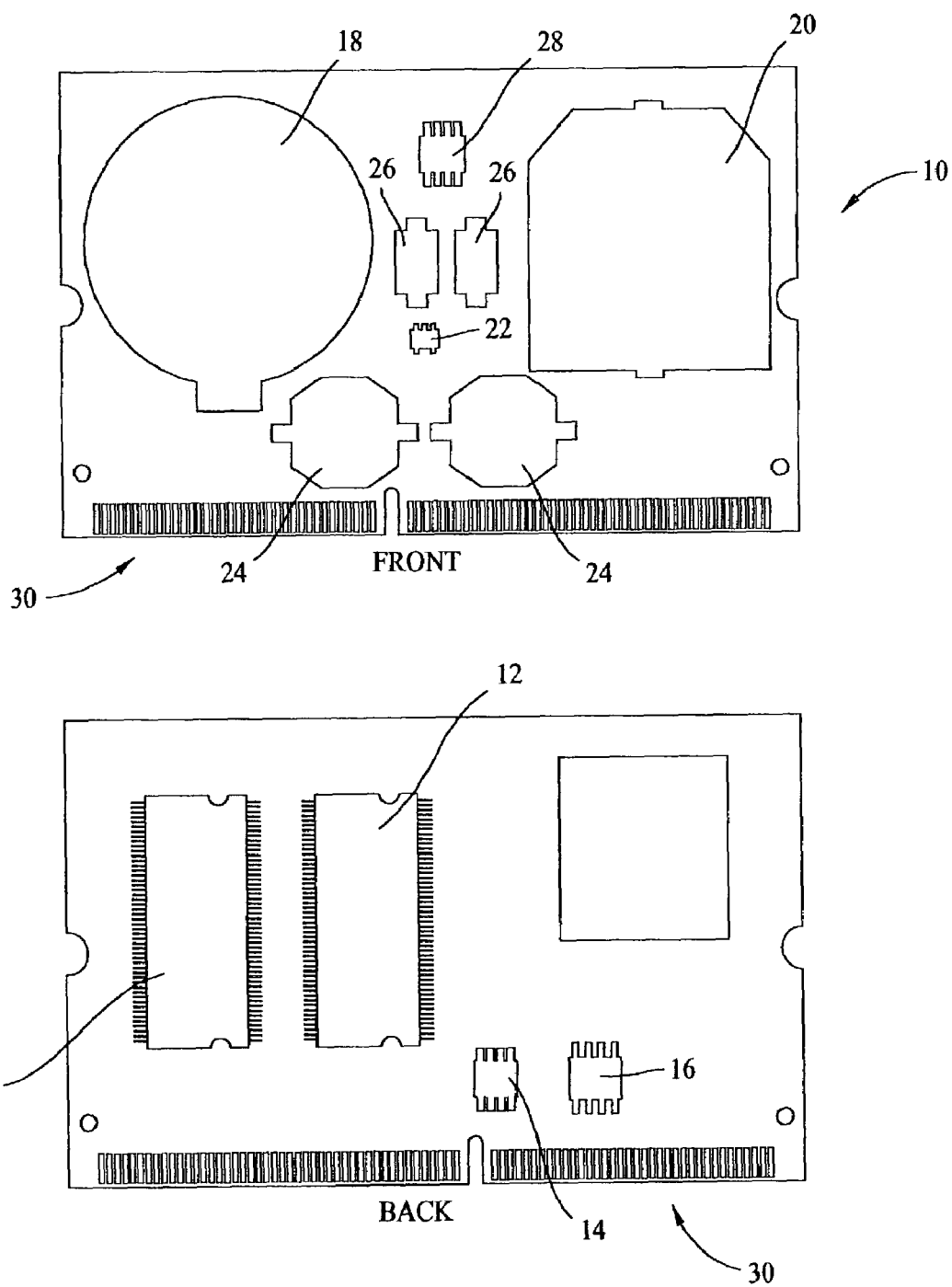
FIG. 1 is a front and back view of one embodiment of a memory module of the present invention.

FIG. 1 is a front and back view of one embodiment of a detachable memory card, or module, 10. In one embodiment, module 10 is a small-outline dual in-line memory module (SO-DIMM) that includes at least one standard synchronous dynamic random access memory (SDRAM) interface (not shown), at least one memory device, or SDRAM, 12, a micropower comparator 14, and a serial presence detect (SPD) electrically-erasable programmable read-only memory (EEPROM) 16. Although in the exemplary embodiment memory module 10 is herein described and illustrated as including at least one SDRAM 12 and at least one SDRAM interface, it will be understood that the present invention is applicable to any type of memory device that requires periodic refresh signals to maintain the memory device's data contents, such as dynamic random access memory (DRAM) devices, and memory module 10 may include any type of memory device that requires periodic refresh signals to maintain the memory device's data contents along with the appropriate interface. Accordingly, memory device 12 is not limited to SDRAMs, but rather may be any DRAM or other memory device that requires periodic refresh signals to maintain memory data. For example, and in one embodiment, memory device 12 is a Rambus dynamic random access memory (RDRAM) device and memory module 10 includes at least one RDRAM interface (not shown). Furthermore, and in another embodiment, memory device 12 is a double data rate synchronous dynamic random access memory (DDR SDRAM). SDRAM 12 and EEPROM 16 are mounted on module 10. In one embodiment, module 10 includes a plurality of memory devices 12.

In the exemplary embodiment, module 10 is illustrated as a small outline DIMM (SO-DIMM), however, it will be understood that module 10 may be any other type of memory card or memory module containing memory devices that require period refresh signals to maintain memory data. For example, in one embodiment, module 10 is an unbuffered DMM. Furthermore, although in the exemplary embodiment memory module 10 is herein illustrated and described as a DIMM, it will be understood that memory module 10 may be any type of detachable memory module or card.

Module 10 also includes a battery 18, a large-value super capacitor 20, a voltage regulator 22, a voltage regulator inductor 24, a voltage regulator capacitor 26, a charge pump 28, and a plurality of edge connector pins 30. Battery 18, capacitor 20, voltage regulator 22, inductor 24, capacitor 26, charge pump 28, and edge connector pins 30 are all mounted on module 10. In one embodiment, module 10 does not include a battery 18, but rather module 10 includes at least one terminal (not shown) that is configured to electrically connect to an external battery (not shown). In an alternative embodiment, module 10 does not include capacitor 20 and associated charge pump 28.

Voltage regulator 22, inductor 24, capacitor 26, and pump 28 are known in the art. Voltage regulator 22 is a micropower single-ended primary inductance converter (SEPIC) voltage regulator that regulates input voltages. For example, in one embodiment, regulator 22 is an LT1615 regulator commercially available from Linear Technology, 720 Sycamore Drive, Milpitas, Calif. 95035. In one embodiment, voltage regulator inductor 24 is a 10 µH 3.8 Amp inductor, commercially available from Pulse, and voltage regulator capacitor 26 is an 22 µF low-equivalent series resistance (ESR) capacitor, commercially available from AVX Corp. Furthermore, in another embodiment, charge pump 28 is a 2.7–5.5 volt input, 5 volt output regulated charge pump, for example part number MAX682ESA commercially available from Maxim.

Module 10 is configured to be inserted within a slot (not shown) on a board (not shown) in a computer-based system (not shown). The term computer-based system, as used herein, refers to any microprocessor-based system including automation control modules (ACMs) and systems using microcontrollers, reduced instruction set circuits (RISC), application specific integrated circuits (ASICs), logic circuits, and/or any other circuit or processor that requires memory. The term ACM refers to any device that is used to control the automation of an activity, including but not limited to programmable logic controllers (PLCs), computer numeric controls (CNCs), motion control products, home automation products, and commercial automation products, for example controls for automated teller machines or car wash systems. In one embodiment, wherein module 10 is a DIMM, module 10 is configured to be inserted within a DIMM slot (not shown) on a motherboard. The motherboard includes a memory controller (not shown) that supports power management memory functions. In the exemplary embodiment, the memory controller is an SDRAM memory controller; however, it will be understood that the memory controller may be any memory controller capable of controlling memory device 12. A power good (PWRGOOD) signal from the motherboard main power supply is fed to an interrupt pin (not shown) on the motherboard. The motherboard senses an impending motherboard power failure using the interrupt pin. In one embodiment, the interrupt pin is a NMI pin on the motherboard. The motherboard services the interrupt and orders SDRAM 12 into the self-refresh power-down mode before the power supply voltage outputs drop out of acceptable tolerance levels to assure SDRAM data integrity.

When the motherboard senses an impending failure of the motherboard main power supply, the motherboard causes the SDRAM controller to issue a sequence of commands and control signals to module 10 that instruct SDRAM 12 to enter into a self-refresh power-down mode. The self-refresh power-down mode retains data values stored on SDRAM 12 and requires no timed or periodic refresh command from the memory controller on the motherboard. In one embodiment, in the self-refresh power-down mode, SDRAM 12 generates a refresh signal internally using an internally generated clock (not shown) to trigger a refresh and word addressing counter (not shown). In an alternative embodiment, in the self-refresh power-down mode, module 10 generates a refresh signal internally using an internally generated clock (not shown) to trigger a refresh and word addressing counter (not shown). While in the self-refresh power-down mode, SDRAM 12 cannot be accessed as a memory device externally due to power constraints and the possibility of contention between an external memory controller's commands and any internal refresh in progress. While in the self-refresh power down mode, SDRAM 12 can exist indefinitely on battery 18 memory backup voltage, provided the backup voltage remains above the SDRAM's minimum acceptable voltage input level for proper operation. Module 10 includes a high-speed asynchronous state machine 40 (shown in FIGS. 2A and 2B) that keeps SDRAM 12 in the self-refresh power down mode until the motherboard resumes normal operation. Upon de-assertion of the motherboard reset after the motherboard is powered-up, the motherboard causes the memory controller to resume normal operation and issue periodic refresh signals to SDRAM 12. When asynchronous state machine 40 detects that the motherboard is both no longer in reset and period refresh signals are being issued by the memory controller on the motherboard, machine 40 will signal SDRAM 12 to come out of the self-refresh power down mode.

Figures 2A, 2B:
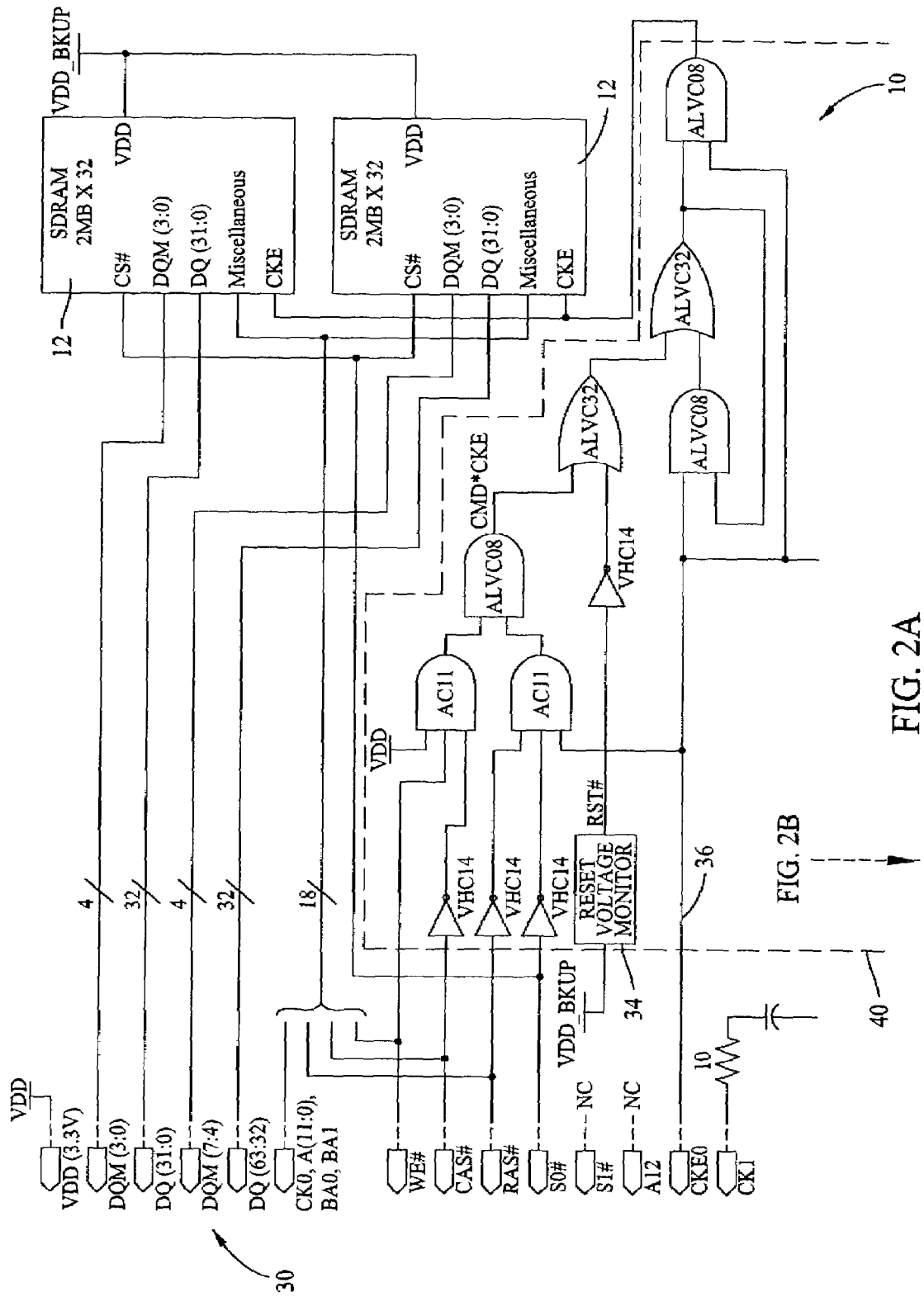
FIGS. 2A and 2B are a circuit diagram illustrating one embodiment of the memory module illustrated in FIG. 1.

FIGS. 2A and 2B are a circuit diagram illustrating one embodiment of memory module 10. Module 10 requires a regulated 3.3 volt supply voltage; however, battery 18 only provides 3.0 nominal volts and degrades down to nearly zero volts over time as battery 18 drains. Therefore, the motherboard main 3.3 volt power supply is combined with battery 18 as an input to voltage regulator 22 to supply a 3.3 volt output voltage to supply SDRAM 12. Voltage regulator 22 thus acts as a 'boost' regulator, using the 3.3 volt system voltage as an input under normal conditions, and using battery 18 as an input when the motherboard power supply fails. In one embodiment, battery 18 is a 3 volt, 1000 A-h lithium coin cell battery, such as part number BR2477A/FB commercially available from Panasonic. Furthermore, and in one embodiment, battery 18 is a lithium cell battery and voltage regulator 22 creates a regulated 3.3 voltage output from a possible input range of 1.2–15 volts, thereby taking advantage of a majority of lithium battery 18 charge capacity.

Large-value super capacitor 20 is connected in parallel with battery 18, and is between battery 18 and voltage regulator 22. Large-value super capacitor 20 and battery 18 form a battery-super capacitor circuit 32. In one embodiment, super capacitor 20 is a 5.5 volt, 1.0 F capacitor, such as, for example, a SuperCap capacitor commercially available from Toko America, part number FCOH105ZTBR44. Large-value super capacitor 20 has enough charge capacity to supply SDRAM 12 for one hour or more, but only when charged up to 5 volts rather than 3.3 volts. To hold large-value super capacitor 20 charged at 5.0 volts, module 10 includes charge pump 28 electrically coupled between the motherboard main 3.3 voltage power supply input and battery 18. Charge pump 28 increases the incoming 3.3 voltage to approximately 5.0 volts. In one embodiment, wherein voltage regulator 22 is a SEPIC voltage regulator, large-value super capacitor 20 maintains the battery-backed memory voltage while battery 18 is being removed from the computer-based system (not shown) for replacement or disposal, during brief (intermittent or less than 1 hour) brownout or power loss conditions, or when memory module 12 is being disconnected and transported to another computer system (not shown) while detached from the motherboard and battery 18 is either discharged or not present. In an alternative embodiment, voltage regulator 22 does not include large-value super capacitor 20 and charge pump 28 and thus module 10 and the motherboard cannot be removed from the computer-based system if battery 18 is discharged or not present without SDRAM 12 losing saved data.

Module 10 further includes a reset voltage monitor 34. In one embodiment, reset voltage monitor 34 is a low-power comparator. Reset voltage monitor 34 grounds an SDRAM CKE clock enable line 36 to a binary logic '0' value and disconnects charge pump 28 from battery-super capacitor circuit 32 using a transistor 38. Driving CKE clock enable line 36 to a binary logic '0' facilitates keeping SDRAM 12 in the self-refresh power down mode after being commanded into the self-refresh power down mode by the memory controller on the motherboard. Transistor 38 prevents backward current draw when charge pump 28 is disabled due to failure of the motherboard main power supply. Micropower comparator 14 trips when the motherboard main power supply droops from the nominal memory module voltage to less than the 10% threshold of SDRAM 12's minimum acceptable voltage level for proper operation. CKE line 36 will have already been driven low by the motherboard memory controller prior to micropower comparator 14 being tripped, but CKE line 36 will no longer be driven and could fluctuate as the motherboard main power supply supplied to the memory controller (not shown) droops away from its nominal voltage when the motherboard main power supply fails, or powers-down. Thus, in one embodiment, transistor 38 grounds CKE line 36 by asynchronous state machine 40 before the memory controller can drop out and to keep CKE line 36 grounded until the memory controller powers back up again, thereby facilitating SDRAM 12 remaining in the self-refresh power-down mode. In the process of issuing commands to put SDRAM 12 into the self-refresh power-down mode, CKE line 36 is driven low and SDRAM 12 will stay in the self-refresh power-down mode until CKE line 36 is driven high. Transistor 38 facilitates preventing CKE line 36 from floating high when not driven and accidentally waking SDRAM 12 up when the memory controller is not operational and providing normal refresh signals.

Asynchronous state machine 40 creates a modified CKE signal to prevent SDRAM 12 from being prematurely removed from the self-refresh power-down mode. Machine 40 changes states quickly and drives the modified CKE low on a high-to-low transition of CKE, but does not drive the modified CKE high again until seeing the motherboard is no longer in reset and seeing the first normal auto refresh cycle from the memory controller. After decoding an auto refresh command, machine 40 switches states to drive CKE high again after some delay. Driving CKE high does not have to be a synchronous event and thus high speed logic is not required on transition to CKE high. However, a high-to-low transition on the input CKE must be transmitted to SDRAM 12 substantially instantaneously to facilitate that the high-to-low transition is received on the same rising clock edge as the self-refresh power-down command. Machine 40 uses high-speed logic, for example ALVC-series high-speed logic commercially available from Texas Instruments, for critical delay paths. The path for a CKE high-to-low transition to change the modified CKE to a low value is two ALVC gates 42 at 2.9 ns delay each, for a total of 5.8 ns. The total delay and setup equals 4 ns+5.8 ns+2 ns=11.8 ns, which is greater than a PC100 100 MHz clock cycle. In one embodiment, to speed the transition an extra ALVC AND gate 44 is positioned at the output of machine 40 to drive the output quickly while machine 40 logic catches up. This removes one of the gate delays and the total cycle time is reduced to 8.9 ns, with 1.1 ins of margin. A power up reset voltage monitor 34 is included to initialize machine 40 to a known value. Voltage monitor 34 is powered from battery 18.

FIG. 3 is a table 42 illustrating state tables for high-speed asynchronous state machine 40. Table 42 includes a primitive flow table, a reduced flow table, and a state table. Each table includes a state description, an idle, waiting for activity state, and a triggered on CKE going low state. The primitive flow table also includes a reset state, an auto refresh state, an alternate reset state 1, an alternate reset state 2, a CKE went high when out already="0" state, a self-refresh state, and an alternate reset state 3

FIG. 4 is a Karnaugh map 44 for high-speed asynchronous state machine 40. Karnaugh map 44 illustrates the reduction of state table 42 to Boolean logic that may be implemented with AND gates, OR gates, and NOT gates (inverters).

Figure 5:
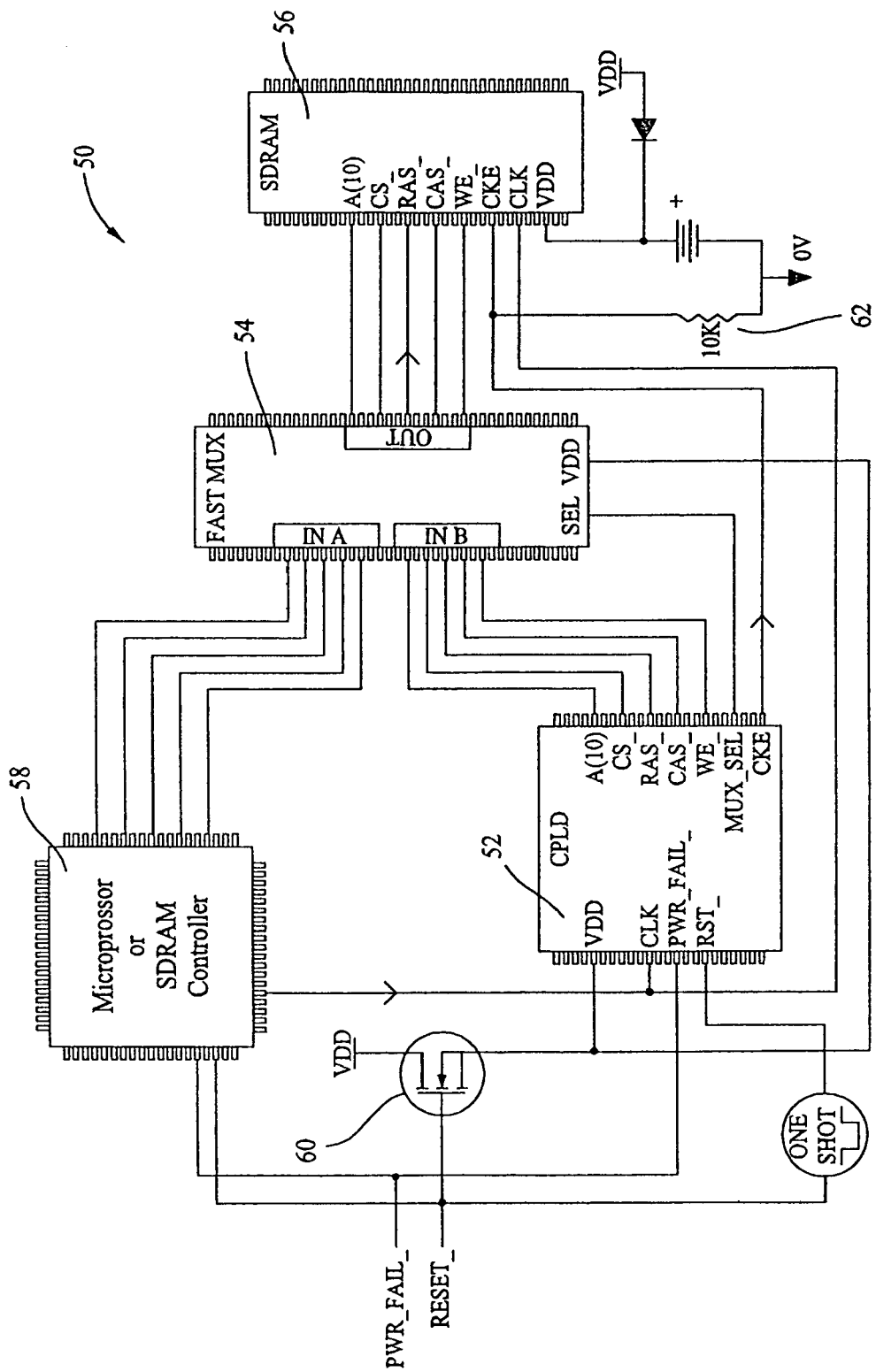
FIG. 5 is a circuit diagram illustrating one embodiment of a power-up/down control circuit of the present invention.

FIG. 5 is a circuit diagram illustrating an alternative embodiment of the present invention. More specifically, FIG. 5 illustrates one embodiment of a power-up/down control circuit 50 for use within computer-based systems (not shown) wherein at least one of the computer based-system's memory controllers or microprocessors do not support power management memory functions required to put memory devices into a self refresh power down mode. Circuit 50 includes a CPLD 52, a high-speed multiplexer 54, and at least one memory device 56 that requires periodic refresh signals to maintain the memory device's data contents, such as an SDRAM, 56. In one embodiment, memory device 56 and circuit 50 are physically mounted on a detachable memory module (not shown). However, it will be understood that memory device 56 and circuit 50 may be physically mounted anywhere within the computer-based system, for example on a main computer-based system circuit board (not shown) or another circuit board (not shown) that is separate from the main computer-based system circuit board. The computer-based system includes a memory controller 58 that is electrically connected to circuit 50 for controlling SDRAM 56. In an alternative embodiment, memory controller 58 is a microprocessor with an embedded memory controller (not shown). In the exemplary embodiment, memory controller 58 is an SDRAM memory controller, however, it will be understood that memory controller 58 may be any memory controller that does not support the power management functions required to put memory devices into a self refresh power down mode and that is capable of controlling memory device 56. In addition, although in the exemplary embodiment circuit 50 is herein described and illustrated as including at least one SDRAM 56, it will be understood that the present invention is applicable to any type of memory device that requires periodic refresh signals to maintain the memory device's data contents, such as dynamic random access memory (DRAM), and circuit 50 may include any type of DRAM or other memory device that requires periodic refresh signals to maintain the memory device's data contents. Accordingly, memory device 56 is not limited to SDRAMs, but rather may be any DRAM or other memory device that requires periodic refresh signals to maintain the memory device's data contents. For example, and in one embodiment, memory device 56 is a RDRAM device.

When the computer-based system senses that the input to the computer-based system power supply is deviating significantly from nominal values, the computer-based system power supply sends an advance power fail warning signal to circuit 50, thereby activating circuit 50. The advance power fail warning signal must go active before the computer-based system enters a reset state or an unstable state due to the resulting degradation in the power supply DC outputs. When the advance power fail warning signal is detected, circuit 50 will logically detach SDRAM 56 from memory controller 58 and feed SDRAM 56 a sequence of commands and control signals that instruct SDRAM 56 to switch into a self-refresh power-down mode. The self-refresh power-down mode retains data values stored on SDRAM 56 and requires no clock or periodic refresh command from memory controller 58. In one embodiment, in the self-refresh power-down mode, SDRAM 56 generates a refresh signal internally using an internally generated clock (not shown) to trigger a refresh and word addressing counter (not shown). In an alternative embodiment, in the self-refresh power-down mode, circuit 50 generates a refresh signal internally using an internally generated clock (not shown) to trigger a refresh and word addressing counter (not shown). While in the self-refresh power-down mode, SDRAM 56 cannot be accessed as a memory device externally due to power constraints and the possibility of contention between an external memory controller's commands and any internal refresh in progress. While in the self-refresh power down mode, SDRAM 56 can exist indefinitely on battery memory backup voltage as long as the backup voltage remains above SDRAM 56's minimum acceptable voltage level for proper operation. Upon de-assertion of the computer-based system reset after the computer-based system is powered-up, circuit 50 feeds SDRAM 56 a sequence of signals that instruct SDRAM 56 to exit the self-refresh power-down mode and logically re-attaches SDRAM 56 to memory controller 58.

Circuit 50 uses multiplexer 54 to switch SDRAM 56 control signal inputs between memory controller 58 and CPLD 52, depending on whichever of controller 58 and CPLD 52 requires control at a given time. After the advance power fail warning signal is detected, CPLD 52 will count to a time value determined by system designers to be greater than the time that computer-based system software requires to finish all SDRAM code execution or data transfer but less than the minimum time at which the computer-based system can go into reset because the power supply DC outputs have finally dropped out of tolerance. CPLD 52 then takes control of SDRAM's 56 control bus and issues the necessary commands to put SDRAM 56 into the self-refresh power-down. When the computer-based system reset is de-asserted because the power supply DC outputs are back up to specification, CPLD 52 will perform a command sequence to exit from the self-refresh power-down mode and return control of SDRAM 56 to memory controller 58. Memory controller 58 resumes periodic refresh signals immediately after computer-based system reset because circuit 50 is no longer supplying refresh signals to SDRAM 56.

In one embodiment, the computer-based system issues a signal or signals to CPLD 52 that indicates that CPLD 52 should place SDRAM 56 into the self refresh power down mode or release SDRAM 56 from the self refresh power down mode. In such an embodiment, CPLD 56 ignores such signals when the computer-based system is in reset due to power loss or other causes, but will respond to such signals otherwise. In this manner, CPLD 52 need not count to a predefined value or release SDRAM 56 from the self refresh power down mode without knowledge of the status of the computer based system. Accordingly, the computer-based system has complete control over when CPLD 56 should place SDRAM 56 into the self refresh power down mode or release SDRAM 56 from the self refresh power mode.

In one embodiment, multiplexer 54 has a very low propagation delay and output select delay such that multiplexer 54 does not impact SDRAM's 56 command word clock setup time requirement. Furthermore, and in one embodiment, the delay requirement tracks the speed of SDRAM's 56 control bus.

In one embodiment, CPLD 52 and multiplexer 54 are powered from a computer-based system battery (not shown). In an alternative embodiment, CPLD 52 does not remain powered up during computer-based system power-down. Furthermore, and in another embodiment, shown in FIG. 5, CPLD 52 is powered off by a FET 60 controlled by the computer-based system reset signal. FET 60 quickly removes power from CPLD 52 such that CPLD 52's outputs do not transition during intermediate power levels, and at least one pulldown resistor 62 on the CKE line and RESET line ensure that the CKE and computer-based system reset signals remain grounded until actively driven. In one embodiment, to cope with the possibility of an advance power fail warning signal pulsing due to noise, the counting state in CPLD 52 is gated with power fail going inactive such that when such a pulse occurs CPLD 52 ceases counting and returns to an idle state without ever accidentally switching SDRAM 56 into the self-refresh power-down mode.

FIGS. 6A and 6B are an example 70 of an SDRAM powerup/down command sequence for memory module 10 and power-up/down control circuit 50. The self-refresh power-down mode is entered using a precharge command followed by a Nop command. The Nop command is followed by a self-refresh command and simultaneous de-assertion of the CKE (clock enable) signal to SDRAM 12 or SDRAM 56. SDRAM 12 or SDRAM 56 then tristates all pins except the CKE pin thereby lowering power consumption. The self-refresh mode is exited by re-asserting of the CKE signal and a simultaneous Nop command followed by at least 6 cycles of Nop commands. The specific implementation of command signal sequences is variably dependent. For example, and in one embodiment, the concept of "mux output" and "CPLD output" would not be used for memory module 10 but would be used for control circuit 50. Accordingly, it will be understood that example 70 is a basic sequence and ordering of command signals common for industry-standard SDRAM devices and is used herein for exemplary purposes only.

FIG. 7 is a table 80 illustrating various SDRAM commands for memory module 10 and power-up/down control circuit 50. SDRAM commands include command inhibit (NOP), no operation (NOP), active, read, write, burst terminate, precharge, auto refresh or self-refresh, load more register, write enable/output enable, and write inhibit/output high-z.

While the invention has been described in terms of various specific embodiments, those skilled in the art will recognize that the invention can be practiced with modification within the spirit and scope of the claims.

What is claimed is:

1. A memory module for a computer-based system including a memory controller, said memory module comprising:

at least one memory device that requires periodic refresh signals to maintain data, said at least one memory device mounted on said memory module;

a circuit mounted on said memory module and configured to retain data stored on said memory device when the computer-based system loses power;

a comparator configured to determine whether a supply of power to the memory controller is less than a threshold, wherein said comparator is located on said memory module separate from the memory controller that refreshes said at least one memory device, wherein the memory controller refreshes said at least one memory device when the supply of power is greater than the threshold; and a transistor coupled to said circuit and configured to maintain a line in a grounded state when the computer-based system loses power.

2. A memory module in accordance with claim 1, wherein said memory device comprises a synchronous dynamic random access memory (SDRAM) device.

3. A memory module in accordance with claim 1, wherein said memory device comprises a Rambus dynamic random access memory (RDRAM) device.

4. A memory module in accordance with claim 1, wherein said memory device comprises a double data rate synchronous dynamic random access memory (DDR SDRAM).

5. A memory module in accordance with claim 1, wherein said memory module comprises a dual in-line memory module (DIMM).

6. A memory module in accordance with claim 1, wherein said memory module comprises a small-outline dual in-line memory module (SO-DIMM).

7. A memory module in accordance with claim 1, wherein said circuit configured to maintain said memory device in a self refresh power down state, and wherein said memory device generates internal refresh signals to maintain data.

8. A memory module in accordance with claim 1, wherein said circuit configured to maintain said memory device in a self refresh power down state, and wherein said circuit generates internal refresh signals to maintain data.

9. A memory module in accordance with claim 1, wherein said circuit configured to signal said memory device to come out of a self refresh power down state, wherein at least one of said circuit and said memory device generates internal refresh signals to maintain data, said circuit configured to signal said memory device into a normal operating mode when said circuit senses the host memory controller is operating normally and issuing normal refresh signals.

10. A memory module in accordance with claim 1, wherein said circuit configured to, when signaled by the memory controller, signal said memory device into a self refresh power down state, and wherein said memory device generates internal refresh signals to maintain data.

11. A memory module in accordance with claim 1, wherein said circuit configured to, when signaled by the memory controller, signal said memory device into a self refresh power down state and wherein said circuit generates internal refresh signals to maintain data.

12. A memory module in accordance with claim 1, wherein said circuit configured to signal said memory device to come out of the self refresh power down state, and wherein at least one of said circuit and said memory device generates internal refresh signals to maintain data, said circuit configured to signal said memory device into a normal operating mode when the computer-based system is no longer in a reset state due to power loss or other causes.

13. A memory module in accordance with claim 1, wherein said circuit and said memory device configured to retain data stored on said memory device when the computer-based system loses power without receiving a refresh signal from the computer-based system.

14. A memory module in accordance with claim 5, wherein the computer-based system includes a motherboard having a DIMM slot, said DIMM is configured to be inserted within the DIMM slot.

15. A memory module in accordance with claim 6, wherein the computer-based system includes a motherboard having a SO-DIMM slot, said SO-DIMM is configured to be inserted within the SO-DIMM slot.

16. A memory module in accordance with claim 1, wherein said circuit comprises a serial presence detect (SPD) electrically-erasable programmable read-only memory (EEPROM).

17. A memory module in accordance with claim 1, wherein said circuit comprises a voltage regulator, a large-value super capacitor, and a battery, wherein said large-value super capacitor electrically connected in parallel with said battery between said battery and said voltage regulator.

18. A memory module for a computer-based system, said memory module comprising:

at least one memory device that requires periodic refresh signals to maintain data, said at least one memory device mounted on said memory module;

a circuit mounted on said memory module and configured to retain data stored on said at least one memory device when the computer-based system loses power, wherein said circuit comprises a voltage regulator, a large-value super capacitor, and a battery, wherein said large-value super capacitor electrically connected in parallel with said battery between said battery and said voltage regulator, wherein said voltage regulator is a micropower single-ended primary inductance converter (SEPIC) voltage regulator; and a transistor coupled to said circuit and configured to maintain a line in a grounded state when the computer-based system loses power.

19. A memory module in accordance with claim 18, wherein said voltage regulator regulates input voltages from 1.2 volts-15 volts to a 3.3 volt output.

20. A memory module in accordance with claim 17, wherein said large-value super capacitor is a 5.5 volt, 1.0 F capacitor.

21. A memory module in accordance with claim 17, wherein said battery is a 3 volt, 1000A-h lithium coin cell battery.

22. A memory module in accordance with claim 17, wherein said circuit further comprises a charge pump electrically coupled between a computer-based system power supply and said battery.

23. A memory module in accordance with claim 22, wherein said charge pump facilitates holding said large-value super capacitor charged.

24. A memory module in accordance with claim 22, wherein said charge pump is a 2.7–5.5 volt input, 5 volt output regulated charge pump.

25. A memory module in accordance with claim 7, wherein said memory device generates the refresh signals using an internally generated clock and a refresh and word addressing counter.

26. A memory module in accordance with claim 8, wherein said circuit generates the refresh signals using an internally generated clock and a refresh and word addressing counter.

27. A method for retaining data saved on a memory device in a computer-based system, the computer-based system including a power supply and a memory controller, at least one memory module having at least one memory device that requires periodic refresh signals to maintain data, and a circuit mounted on the memory module, said method comprising:
  sensing an impending loss of power from the computer-based system power supply;
  using the circuit, signaling the memory device into a self refresh power down state, wherein at least one of the memory device and the circuit generates internal refresh signals to maintain data;
  using the circuit, maintaining the self refresh power down state while the computer-based system is inactive;
  determining, by a comparator, whether a supply of power to the memory controller is less than a threshold, wherein the comparator is located on the memory module separate from the memory controller that refreshes the memory device, wherein the memory controller refreshes the memory device when the supply of power is greater than the threshold; and
  maintaining a line coupled to the circuit in a grounded state when the computer-based system loses power.

28. A method in accordance with claim 27, wherein said sensing an impending loss of power from the computer-based system power supply comprises sensing an impending loss of power using the computer-based system.

29. A method in accordance with claim 27, wherein at least one of the memory device and the circuit include an internally generated clock and a refresh and word addressing counter, said method further comprising generating internal refresh signals using the internally generated clock and the refresh and word addressing counter.

30. A method in accordance with claim 27, further comprising:
  sensing the host memory controller is operating normally and issuing normal refresh signals; and
  using the circuit, signaling the memory device to come out of the self refresh power down state and into a normal operating mode.

31. A method for retaining data saved on a memory device in a computer-based system, the computer-based system including a power supply, at least one memory module having at least one memory device that requires periodic refresh signals to maintain data, and a circuit mounted on the memory module, said method comprising:
  sensing an impending loss of power from the computer-based system power supply;
  using the circuit, signaling the memory device into a self refresh power down state, wherein at least one of the memory device and the circuit generates internal refresh signals to maintain data;
  using the circuit, maintaining the self refresh power down state while the computer-based system is inactive, wherein the circuit includes a voltage regulator, a battery, and a large-value super capacitor electrically connected in parallel with the battery between the battery and the voltage regulator, said maintaining the self refresh power down state while the computer-based system is inactive comprising powering the memory device using the voltage regulator, the battery, and the large-value super capacitor;and
  maintaining a line coupled to the circuit in a grounded state when the computer-based system loses power.

32. A method in accordance with claim 31, wherein the circuit further comprises a charge pump electrically coupled between the computer-based system power supply and the battery, said maintaining the self refresh power down state while the computer-based system is inactive comprising facilitating holding the large-value super capacitor charged using the charge pump.

33. A method in accordance with claim 27, wherein the memory device comprises a synchronous dynamic random access memory (SDRAM) device, said maintaining the self refresh power down state while the computer-based system is inactive comprising maintaining the SDRAM device in the self-refresh power down state using the circuit.

34. A method in accordance with claim 27, wherein the memory device comprises a Rambus dynamic random access memory (RDRAM) device, said maintaining the self refresh power down state while the computer-based system is inactive comprising maintaining the RDRAM device in the self-refresh power down state using the circuit.

35. A method in accordance with claim 27, wherein the memory device comprises a double data rate synchronous dynamic random access memory (DDR SDRAM) device, said maintaining the self refresh power down state while the computer-based system is inactive comprising maintaining the DDR SDRAM device in the self-refresh power down state using the circuit.

36. A control circuit for controlling at least one memory device in a computer-based system having at least one memory controller, said circuit comprising:
  at least one memory device that requires periodic refresh signals to maintain data, said circuit configured to logically detach said at least one memory device from the at least one memory controller when the computer-based system loses power and retain data stored on said memory device when the computer-based system loses power;
  a programmable logic device (PLD) configured to initiate a time count to a specific value upon receiving a signal from the computer-based system indicating to enter in a self-refresh mode, wherein a supply of power to the at least one memory controller is less than a threshold during the self-refresh mode, wherein said PLD is separate from said at least one memory device; and
  a transistor configured to remove power from said PLD when the computer-based system loses power.

37. A control circuit in accordance with claim 36, wherein said control circuit configured to signal said at least one memory device into a self-refresh power down state, and wherein at least one of said memory device and said circuit generates internal refresh signals to maintain data when the computer-based system loses power.

38. A control circuit in accordance with claim 37, wherein the at least one memory controller does not support the power management memory functions used for signaling memory devices into the self refresh power down state.

39. A control circuit in accordance with claim 36, wherein said control circuit configured to maintain said memory device in a self-refresh power down state wherein at least one of said memory device and said circuit generates internal refresh signals to maintain data.

40. A control circuit in accordance with claim 37, wherein said control circuit configured to signal said memory device to come out of the self-refresh power down state and into a normal operating mode when the computer-based system is no longer in at least one of a reset state and a unstable state.

41. A control circuit in accordance with claim 36, wherein said circuit configured to retain data stored on said at least one memory device when the computer-based system loses power without receiving a refresh signal from the computer-based system.

42. A control circuit in accordance with claim 37, wherein at least one of said memory device and said circuit generates the refresh signals using an internally generated clock and a refresh and word addressing counter.

43. A control circuit in accordance with claim 36, wherein said circuit further comprises at least one multiplexer.

44. A control circuit in accordance with claim 43, wherein said multiplexer is a high-speed multiplexer.

45. A control circuit in accordance with claim 43, wherein said multiplexer configured to select control of said at least one memory device between said PLD and the at least one memory controller.

46. A control circuit in accordance with claim 36, wherein the at least one memory controller is embedded within a microprocessor.

47. A control circuit in accordance with claim 43, wherein said PLD logically detaches said at least one memory device from the at least one memory controller when the computer-based system loses power.

48. A control circuit in accordance with claim 43, wherein said PLD configured to command said at least one memory device into a self-refresh power-down mode, and wherein at least one of said circuit and said memory device generates a refresh signal for said at least one memory device.

49. A control circuit in accordance with claim 43, wherein the computer-based system includes a battery, said multiplexer and said PLD powered from the battery.

50. A control circuit in accordance with claim 43 wherein said PLD powers down when the computer-based system loses power.

51. A control circuit in accordance with claim 43, wherein said PLD powered off by a FET controlled by a computer-based system reset signal.

52. A control circuit in accordance with claim 36, wherein said memory device comprises a synchronous dynamic random access memory (SDRAM) device.

53. A control circuit in accordance with claim 36, wherein said memory device comprises a Rambus dynamic random access memory (RDRAM) device.

54. A control circuit in accordance with claim 36, wherein said memory device comprises a double data rate synchronous dynamic random access memory (DDR SDRAM) device.

55. A control circuit in accordance with claim 37, wherein said control circuit configured to signal said memory device to come out of the self-refresh power down state and into a normal operating mode when said circuit senses the memory controller is operating normally and issuing normal refresh signals.

56. A control circuit in accordance with claim 36, wherein said control circuit mounted to a detachable memory module.

57. A control circuit in accordance with claim 36, wherein the computer-based system includes a main circuit board, said control circuit mounted on the main circuit board.

58. A control circuit in accordance with claim 36, wherein the computer-based system includes a main circuit board and a separate circuit board, said control circuit mounted on the main circuit board.

59. A method for retaining data saved on at least one memory device in a computer-based system using a circuit, the computer-based system including a power supply and a memory controller, the memory device requiring periodic refresh signals to maintain data, said method comprising:
sensing an impending loss of power from the computer-based system power supply;
logically detaching the memory device from the memory controller using the circuit;
initiating, by a programmable logic device, a time count to a specific value upon receiving a signal from the computer-based system indicating to enter in a self-refresh mode, wherein a supply of power to the memory controller is less than a threshold during the self-refresh mode, wherein the programmable logic device is separate from the at least one memory device.

60. A method in accordance with claim 59, wherein the memory device includes a self-refresh power-down state, wherein at least one of the circuit and the memory device generates a refresh signal for the at least one memory device, said logically detaching the memory device from the memory controller using the circuit comprises signaling the memory device into the self-refresh power-down state.

61. A method in accordance with claim 59, wherein the memory device comprises a synchronous dynamic random access memory (SDRAM) device, said logically detaching the memory device from the memory controller comprising logically detaching the SDRAM device from the memory controller.

62. A method in accordance with claim 59, wherein the memory device comprises a Rambus dynamic random access memory (RDRAM) device, said logically detaching the memory device from the memory controller comprising logically detaching the RDRAM device from the memory controller.

63. A control circuit in accordance with claim 36, wherein said programmable logic device configured to finish the time count to the specific value before sending a signal to the at least one memory device indicating to enter the self-refresh mode.

64. A control circuit in accordance with claim 36, wherein said programmable logic device configured to discontinue the time count to the specific value upon receiving a signal that a power supply to the computer-based system has reached a specific level.

65. A control circuit in accordance with claim 36, wherein said at least one memory device cannot be accessed by the computer-based system during a refresh of said at least one memory device.

66. A control circuit in accordance with claim 36, wherein said at least one memory device enters the self-refresh mode upon receiving a command sequence including a precharge command, a no operation command, and a self-refresh command.

* * * * *